(12) United States Patent
Semon et al.

(10) Patent No.: US 12,353,168 B2
(45) Date of Patent: Jul. 8, 2025

(54) PART FOR TIMEPIECE MOVEMENT, TIMEPIECE MOVEMENT, TIMEPIECE, AND METHOD FOR MANUFACTURING SUCH A PART FOR TIMEPIECE MOVEMENT

(71) Applicant: LVMH Swiss Manufactures SA, La Chaux-de-Fonds (CH)

(72) Inventors: Guy Semon, Evette-Salbert (FR); Jason Lund, Les Geneveys-sur Coffrane (CH); Brian Jensen, Orem, UT (US)

(73) Assignee: LVMH Swiss Manufactures SA, La Chaux-de-Fonds (CH)

(*) Notice: Subject to any disclaimer, the term of this patent is extended or adjusted under 35 U.S.C. 154(b) by 1017 days.

(21) Appl. No.: 16/312,602

(22) PCT Filed: Jun. 21, 2017

(86) PCT No.: PCT/EP2017/065276
§ 371 (c)(1),
(2) Date: Dec. 21, 2018

(87) PCT Pub. No.: WO2017/220672
PCT Pub. Date: Dec. 28, 2017

(65) Prior Publication Data
US 2019/0212702 A1    Jul. 11, 2019

(30) Foreign Application Priority Data

Jun. 21, 2016  (FR) ..................... 16 55786

(51) Int. Cl.
*B32B 9/00*     (2006.01)
*C01B 32/16*    (2017.01)
(Continued)

(52) U.S. Cl.
CPC ............. *G04B 1/145* (2013.01); *C01B 32/16* (2017.08); *G04B 17/066* (2013.01); *B82Y 15/00* (2013.01);
(Continued)

(58) Field of Classification Search
CPC ..... C01B 32/156; Y10T 428/30; B32B 9/007; B82Y 30/00; B82Y 40/00; Y10S 977/742
(Continued)

(56) References Cited

U.S. PATENT DOCUMENTS

2008/0305386 A1* 12/2008 Havel .................. H02N 11/002
429/50
2010/0123267 A1*  5/2010 Jiang ..................... B29C 55/04
264/291

(Continued)

FOREIGN PATENT DOCUMENTS

EP    1256853 A2    11/2002
EP    1256854 A2    11/2002
(Continued)

OTHER PUBLICATIONS

European Office Action related to Application No. 17730518.2; reported on Aug. 27, 2021.
(Continued)

*Primary Examiner* — Daniel H Miller
(74) *Attorney, Agent, or Firm* — von Briesen & Roper, s.c.

(57) ABSTRACT

Part for a timepiece movement, made of a composite material comprising a rigid matrix and a forest of nanotubes contained in the rigid matrix.

13 Claims, 7 Drawing Sheets

(51) Int. Cl.
    *G04B 1/14*     (2006.01)
    *G04B 17/06*    (2006.01)
    *B82Y 15/00*    (2011.01)
    *B82Y 40/00*    (2011.01)
    *G04B 17/04*    (2006.01)

(52) U.S. Cl.
    CPC ........... *B82Y 40/00* (2013.01); *C01B 2202/02* (2013.01); *C01B 2202/06* (2013.01); *G04B 17/045* (2013.01)

(58) Field of Classification Search
    USPC ....................................................... 428/408
    See application file for complete search history.

(56) References Cited

U.S. PATENT DOCUMENTS

2010/0294424 A1   11/2010   Hart et al.
2013/0294999 A1   11/2013   Liu et al.

FOREIGN PATENT DOCUMENTS

JP      H01120448 A     5/1989
JP      2008116205 A    5/2008

OTHER PUBLICATIONS

Hutchinson et al.: "Carbon Nanotubes as a Framework for High-Aspect-Ratio MEMS Fabrication", Journal of Microelectromechanical Systems, IEEE Service Center, US, vol. 19, No. 1, Feb. 1, 2010, pp. 75-82, XP011298225, ISSN: 1057-7157.

Korean Office Action related to Application No. 10-2019-7000754; reported on Jul. 7, 2021.
International Search Report Application No. PCT/EP2017/065276; Reported on Sep. 15, 2017.
Hanna Brandon H et al: "Mechanical Property Measurement of Carbon Infiltrated Carbon Nanotube Structures for Compliant Micromechanisms", Journal of Microelectromechanical Systems, IEEE Service Center, US, vol. 23, No. 6, Dec. 1, 2014 (Dec. 1, 2014), pp. 1330-1339, XP011565571, ISSN: 1057-7157, DOI: 10.1109/JMEMS.2014.2312847 [retrieved on Nov. 25, 2014] p. 1331, paragraph II-VII; figures 1,3,12.
Bin Zhao et al: "Exploring Advantages of Diverse Carbon Nanotube Forests With Tailored Structures Synthesized by Supergrowth from Engineered Catalysts", ACS Nano, vol. 3, No. 1, Jan. 27, 2009 (Jan. 27, 2009), pp. 108-114, XP055401259, US ISSN: 1936-0851, DOI: 10.1021/nn800648a figure 1.
Ming Xu et al: "Alignment Control of Carbon Nanotube Forest from Random to Nearly Perfectly Aligned by Utilizing the Crowding Effect", ACS Nano, vol. 6, No. 7, Jul. 24, 2012 (Jul. 24, 2012), pp. 5837-5844, XP055357311, US ISSN: 1936-0851, DOI: 10.1021/nn300142j figues 2,4.
Hutchinson D N et al: "Carbon Nanotubes as a Framework for High-Aspect-Ratio MEMS Fabrication", Journal of Microelectromechanical Systems, IEEE Service Center, US, vol. 19, No. 1, Feb. 1, 2010 (Feb. 1, 2012), pp. 75-82, XP011298225, ISSN: 1057-7157 p. 80, col. 1, lines 18-23; figures 6d, 6e.
Bo Li et al: "Highly Organized Two- and Three-Dimensional Single-Walled Carbon Nanotube-Polymer Hybrid Architectures", ACS Nano. vol. 5, No. 6., Jun. 28, 2011 (Jun. 28, 2011), pp. 4826-4834, XP055357310, US ISSN: 1936-0851, DOI: 10.1021/nn2008782 p. 4828, col. 2, line 17-p. 4829, col. 2, line 7; figure 3 Experimental Section; p. 4833, paragraph 2.

\* cited by examiner

PART FOR TIMEPIECE MOVEMENT, TIMEPIECE MOVEMENT, TIMEPIECE, AND METHOD FOR MANUFACTURING SUCH A PART FOR TIMEPIECE MOVEMENT

CROSS-REFERENCE TO RELATED APPLICATION

This Application is a 35 USC § 371 US National Stage filing of International Application No. PCT/EP2017/065276 filed on Jun. 21, 2017, and claims priority under the Paris Convention to French Patent Application No. 16 55786 filed on Jun. 21, 2016.

FIELD OF THE DISCLOSURE

The present invention relates to parts for timepiece movements, to timepiece movements and timepieces, and to manufacturing processes for such parts for timepiece movements.

BACKGROUND OF THE DISCLOSURE

Timepiece movements typically comprise a regulator, a mechanical oscillator which determines the time base of the timepiece movement. This regulator includes a coil spring associated with an oscillating weight called a balance. This coil spring requires extreme dimensional precision, which determines the timekeeping accuracy of the timepiece movement.

An example of a coil spring is given in particular in document JP2008116205A. This coil spring is made of a composite material comprising a matrix of graphite and of amorphous carbon, reinforced with carbon nanotubes dispersed in the matrix and aligned in the longitudinal direction of the coil. The nanotubes have a diameter of about 10 nm and a length of about 10 microns. To manufacture the coil, a homogeneous mixture is first produced with the nanotubes, graphite, and amorphous carbon, then the mixture is extruded to obtain the shape of the coil spring with the aim of aligning the nanotubes within the length of the coil.

Such a coil spring has many disadvantages:
the extrusion process does not allow high mechanical precision, resulting in unacceptable timekeeping inaccuracy,
the orientation of the nanotubes is poorly controlled, since the nanotubes are arranged randomly in the homogeneous mixture,
the method is complex to implement for ensuring good homogeneity of the material, which leads to regularity in the coil spring,
it is complex to obtain the desired mechanical properties of the coil spring, because one must adjust the amounts of the mixture very precisely while maintaining homogeneity.

These disadvantages also exist, at least in part, for other flexible parts for a timepiece movement.

SUMMARY OF THE DISCLOSURE

The present invention is intended to overcome some or all of the above disadvantages.

To this end, the invention provides a part for a timepiece movement comprising at least one flexible portion, said flexible portion being adapted to bend in a plane perpendicular to an axis and being made of a composite material comprising nanotubes bound in a matrix, characterized in that the nanotubes form a forest of nanotubes, the nanotubes being juxtaposed and generally arranged in parallel to the axis.

With these arrangements, it is possible to create the part for a timepiece movement with an accuracy of a few nanometers, with an orientation of the nanotubes and a homogeneity that are fully controlled and reproducible, obtained through processes for nanotube growth and infiltration of the matrix in the forest of nanotubes. If the part for a timepiece movement is a coil spring, the result is exceptional timekeeping accuracy of the coil spring.

In addition, it is simple to obtain the desired mechanical properties of the part for a timepiece movement, for example by adjusting the matrix material and/or the amount of infiltrated matrix in the forest of nanotubes.

Unlike the patent mentioned above, the nanotubes are oriented perpendicularly to the bending plane and not within that plane. This goes against the teachings of JP2008116205A, which advises aligning the nanotubes within the length of the coil in order to use their mechanical bending properties, known to persons skilled in the art. In contrast, in the part for a timepiece movement of the invention, the nanotubes are not used for their mechanical properties and contribute only slightly if at all to the mechanical properties of the part for a timepiece movement, unlike the aforementioned document JP2008116205A (since a bending of the part does not result in a bending of the nanotubes), but instead are used for their geometric precision in growth, the mechanical properties being provided by the infiltrated matrix.

In addition, the composite material thus obtained is particularly flexible within the plane perpendicular to the axis (which allows decreasing the mass of the balance in the case of a coil spring) and is practically inflexible outside this plane (which is of particular interest for a coil spring of a timepiece).

Finally, the above arrangements make it possible to simplify the manufacturing process, by growing the nanotubes on a substrate such as a silicon wafer, commonly designated by the term "wafer".

In various embodiments of the part for a timepiece movement according to the invention, one or more of the following arrangements may possibly be further employed:
the nanotubes are of carbon;
the nanotubes are multi-walled;
the nanotubes have a diameter comprised between 7 and 30 nm (or optionally between 2 and 10 nm, preferably between 3 and 7 nm, in particular about 5 nm);
the nanotubes have a length comprised between 200 and 400 microns (or optionally between 100 and 200 microns, in particular about 150 microns);
the matrix is of carbon;
said part for a timepiece movement is a coil spring adapted to oscillate about the axis;
said part for a timepiece movement is an oscillator for a timepiece movement;
said part for a timepiece movement is a mainspring.

The invention also relates to a timepiece movement having a coil spring as defined above (or other part for a timepiece movement as defined above), and a timepiece comprising such a timepiece movement.

The invention also relates to a method for manufacturing a part for a timepiece movement as defined above, comprising the following steps:
a) a step of growing the forest of nanotubes, during which the forest of nanotubes is grown;

b) an infiltration step, during which the component material of the matrix infiltrates the forest of nanotubes.

In various embodiments of the manufacturing method according to the invention, one or more of the following arrangements may possibly be further employed:

during the step a) of growing the forest of nanotubes, the forest of nanotubes is grown on a substrate (possibly with one or more intermediate layers between the substrate and the additional layer), and the infiltration step b) is followed by a separation step c) during which the composite material is separated from the substrate;

during the step a) of growing the forest of nanotubes, the forest of nanotubes is grown substantially perpendicularly to the substrate;

before step a), an additional porous layer of nanotubes is first sprayed onto the substrate (possibly with one or more intermediate layers between the substrate and the additional layer), then during step a) the forest of nanotubes is grown under the additional porous layer of nanotubes, and during step b) the component material of the matrix infiltrates through the additional porous layer of nanotubes;

at least one intermediate layer is interposed between the substrate and the forest of nanotubes.

BRIEF DESCRIPTION OF DRAWINGS

Other features and advantages of the invention will be apparent from the following description of several of its embodiments, given as non-limiting examples, with regard to the accompanying drawings.

In the drawings.

DETAILED DESCRIPTION OF THE DISCLOSURE

In the various figures, the same references denote identical or similar elements.

Figure 1:
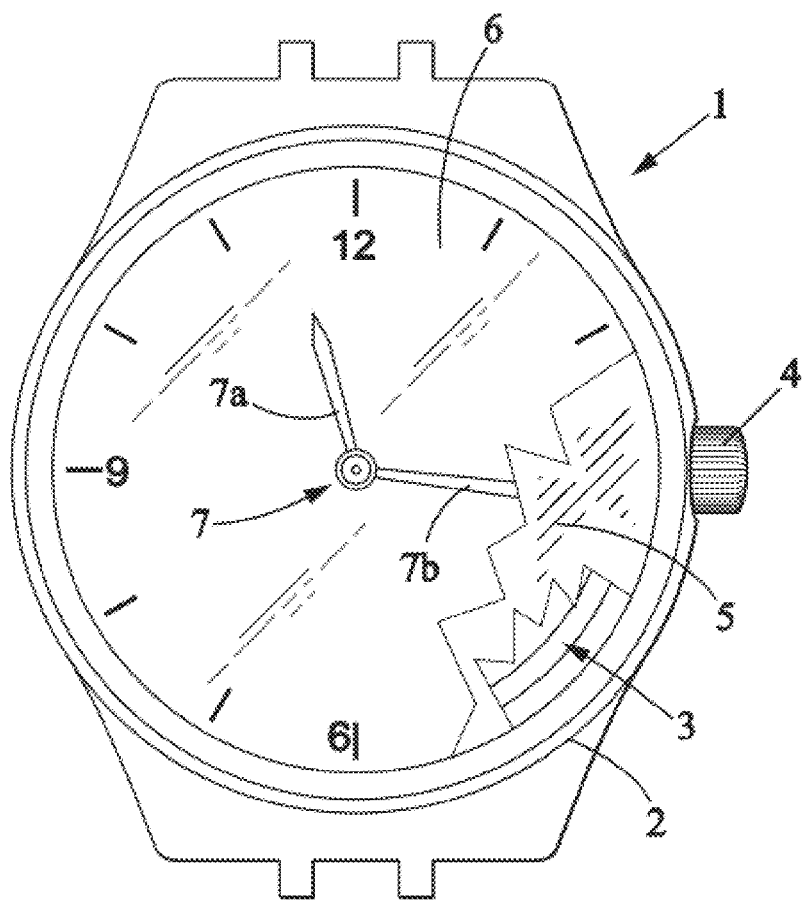
FIG. 1 is a schematic view of a timepiece able to comprise a coil spring according to a first embodiment of the invention.

FIG. 1 represents a timepiece 1 such as a watch, comprising:
a case 2,
a timepiece movement 3 contained in the case 2, generally, a winding mechanism 4,
a dial 5,
a crystal 6 covering the dial 5,
a time indicator 7, for example comprising two hands 7a, 7b for the hours and minutes respectively, arranged between the crystal 6 and the dial 5 and actuated by the timepiece movement 3.

Figure 2:
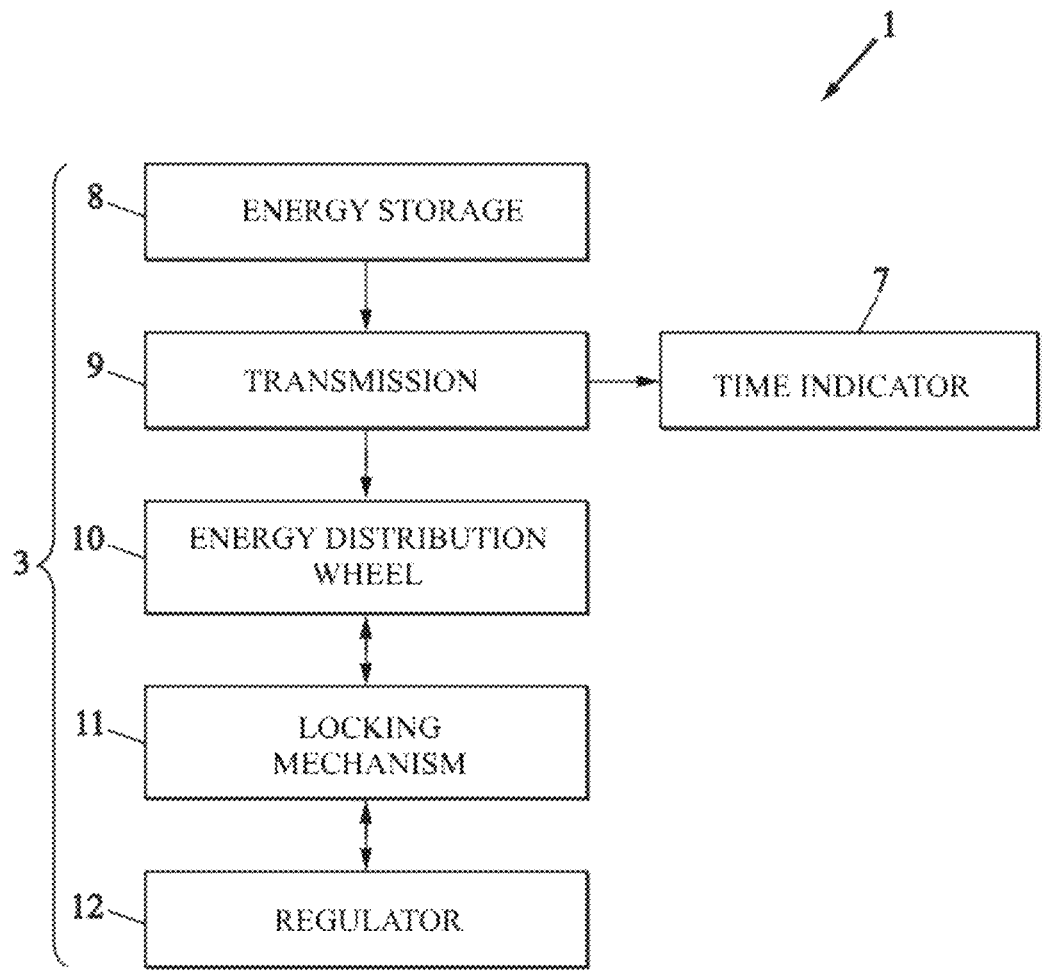
FIG. 2 is a block diagram of the movement of the timepiece of FIG. 1.

As is schematically represented in FIG. 2, the timepiece movement 3 may for example comprise:
a device 8 for storing mechanical energy, typically a mainspring,
a mechanical transmission 9 driven by the device 8 for storing mechanical energy,
the abovementioned time indicator 7,
an energy distribution wheel 10 (for example an escapement wheel of a Swiss anchor escapement or similar),
a locking mechanism 11 (for example a Swiss anchor or similar) suitable for sequentially holding and releasing the energy distribution wheel 10,
a regulator 12, which is an oscillating mechanism controlling the locking mechanism 11 to move it regularly so that the energy distribution wheel 10 is moved at constant time intervals.

Figure 3:
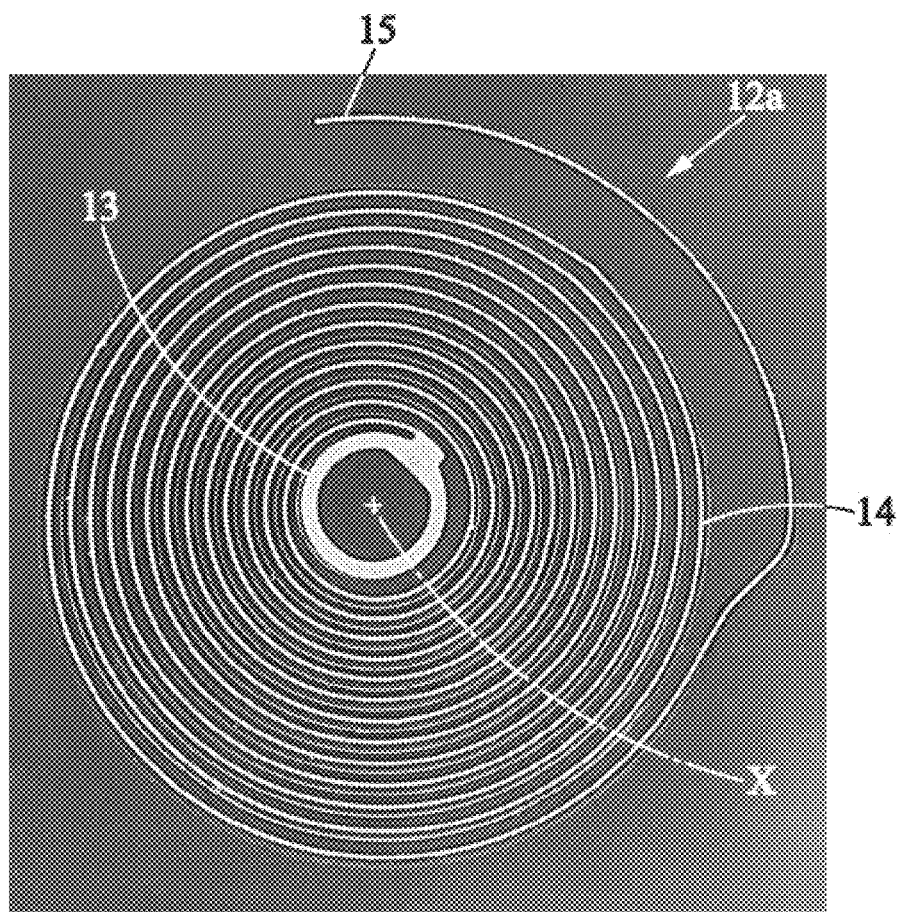
FIG. 3 is a photograph of a coil spring usable in the timepiece of FIG. 1.
Figure 4:
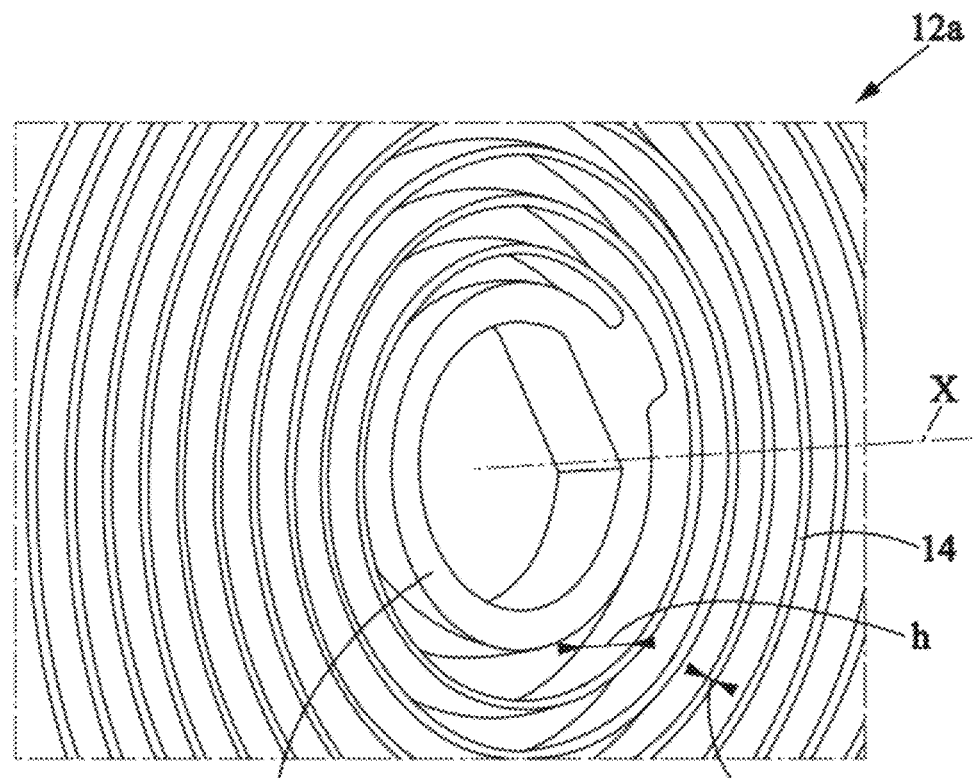
FIG. 4 is a perspective view of a portion of the coil spring of FIG. 3, FIG. 5 highly schematically illustrates the composition of the material of the coil spring in the form of a forest of nanotubes, the nanotubes being deliberately enlarged for clarity and therefore not represented to scale.

The regulator 12 comprises an oscillating weight, for example a balance (not shown) and a coil spring 12a such as the one represented in FIGS. 3 and 4.

The coil spring 12a may include:
a central ring 13 intended to be fixed at the center of the balance, and rotating with the balance about a central axis X,
several turns 14 winding about the central axis X, from the ring 13 to a terminal portion 15 called the "terminal curve".

The terminal portion 15 is attached, usually by a stud (not shown), to a bridge (not shown) on which the balance is pivotally mounted.

The turns 14 and the terminal portion 15 of the coil spring 12a may have a thickness e (in the plane perpendicular to the central axis X) and a height h (parallel to the central axis X). The thickness e may for example be several tens of microns, for example from about 10 to 100 microns.

Figure 5:
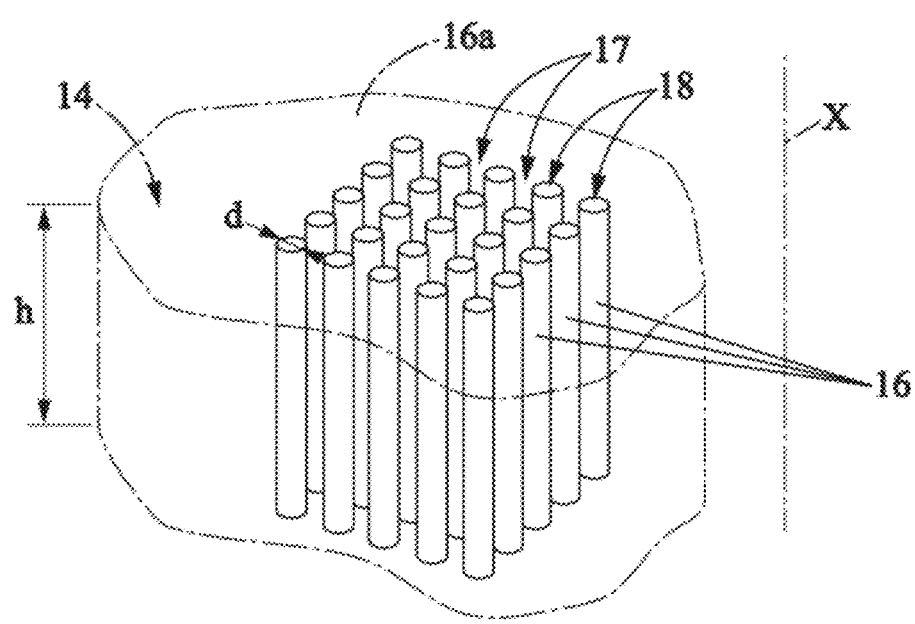

The coil spring 12a is made of a composite material comprising nanotubes 16 (FIG. 5) bound in a matrix 16a.

The nanotubes 16 form a forest of nanotubes, which means that the nanotubes 16 are juxtaposed and all arranged substantially parallel to one another.

Advantageously, the nanotubes 16 are all arranged substantially parallel to the central axis X, therefore generally parallel to the central axis X. They are generally evenly spaced apart from one another and are present throughout the entire mass of the composite material, with a surface density (in the plane perpendicular to the axis X) that is controlled by the nanotube growth process during the manufacture of the coil spring 12a.

The nanotubes 16 may advantageously be made of carbon.

The nanotubes 16 may advantageously be essentially multi-walled. Optionally, the nanotubes 16 may advantageously be primarily single-walled.

The nanotubes may have a diameter d comprised between 7 and 30 nm. Optionally, the nanotubes may have a diameter comprised between 2 and 10 nm, preferably between 3 and 7 nm, in particular about 5 nm.

The nanotubes may have a length comprised between 200 and 400 microns. Optionally, the nanotubes may have a length of between 100 and 200 microns, in particular about 150 microns. This length may advantageously correspond to the abovementioned thickness h of the turns 14 of the coil spring.

The matrix 16a may advantageously also be made of carbon. The matrix 16a is highly schematically represented in FIG. 5. It may advantageously encompass the nanotubes 16, being present in the gaps 17 between nanotubes 16 and within the inner space 18 of the nanotubes 16. This matrix makes it possible to provide cohesion between nanotubes and thereby modify the mechanical properties of the forest of nanotubes.

The coil spring 12a may be manufactured by a method comprising for example the following steps:
  a) a step of growing the forest of nanotubes, during which the forest of nanotubes 16 is grown, generally on a substrate (not shown) such as a wafer of silicon or other,
  b) an infiltration step, during which the component material of the matrix 16a infiltrates the forest of nanotubes 16,
  c) a separation step during which the composite material is separated from the substrate.

During step a), it is advantageous to grow the forest of nanotubes 16 substantially perpendicularly to the substrate, which is arranged perpendicularly to the central axis X.

The substrate is pretreated for example by photolithography, in a known manner, so that the growth of the forest of nanotubes occurs at the exact locations desired, along the exact path of the coil spring 12a. Examples of controlled processes for the growing of nanotubes and the infiltration by a carbon matrix are given for example in the document "Mechanical and electrical properties of carbon-nanotube-templated metallic micro-structures" by the author Richard Scott Hansen (June 2012), or in the Senior Thesis of Collin Brown (22 Apr. 2014) of Brigham Young University entitled "Infiltration of CNT forests by Atomic Layer Deposition for MEMS applications."

Infiltration of the carbon matrix, which is known per se, particularly from the above documents, generally takes place by vapor deposition. By acting on the infiltration time, one can affect the amount of infiltrated matrix between the nanotubes, which makes it very easy to change the mechanical properties of the spring.

Figure 8:
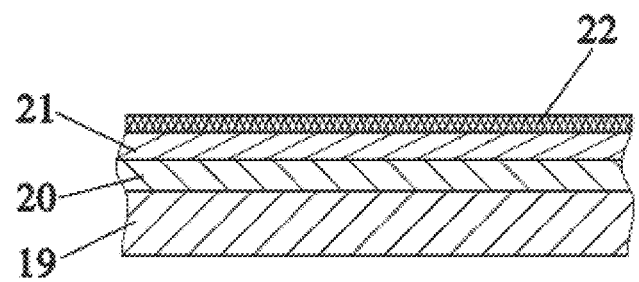
FIGS. 8 and 9 illustrate a method of manufacture of a spring by growing a forest of nanotubes on a substrate.
Figure 9:
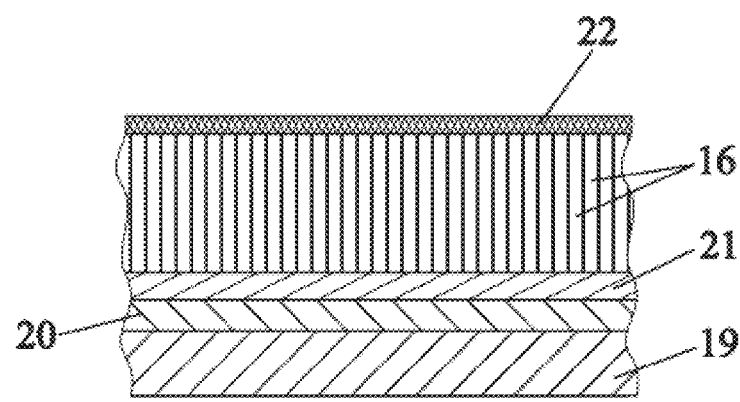

As represented in FIGS. 8 and 9, the substrate 19 (silicon or other) may be covered with a silica layer 20, itself covered with a catalyst layer 21 (in particular iron) on which the forest of nanotubes 16 is grown. The silica layer 20 and catalyst layer 21 remain integral with the forest of nanotubes 16 and are therefore separated from the substrate 19 along with the layer of nanotubes in the above step c).

Prior to the above step a), additional nanotubes may optionally be dispersed in a solvent and sprayed, in particular by ultrasound, on the catalyst layer 21, in order to define an additional layer 22 of nanotubes. This additional layer 22 of nanotubes is sufficiently porous for the carbon (or other component material) of the forest of nanotubes 16 to be deposited through said additional layer 22 of nanotubes and grow beneath said additional layer of nanotubes (FIG. 9). In this manner, the growth of nanotubes 16 of the forest of nanotubes is equalized, so they thus all have substantially the same length. The infiltration step b) is then also carried out through the additional layer 22 of nanotubes, due to its porosity.

During step c), the composite material can be separated from the substrate 19 by wet etching or preferably by vapor phase etching, in particular using hydrogen fluoride HF.

The coil spring 12a obtained has many advantages:
  the coil spring can be created with nanometric precision, with an orientation of the nanotubes and a homogeneity that are fully controlled and reproducible, obtained by the process of nanotube growth and infiltration of the matrix into the forest of nanotubes, resulting in exceptional timekeeping accuracy of the coil spring;
  it is easy to obtain the desired mechanical properties of the coil spring, for example by adjusting the material of the matrix and/or the amount of infiltrated matrix in the forest of nanotubes and by adjusting the geometry of the coil (particularly its thickness);
  the coil spring 12a is particularly flexible in the plane perpendicular to the central axis (which allows decreasing the mass of the balance) and is practically inflexible outside this plane (which is of particular interest for a timepiece coil spring, in order to limit the effects of accelerations outside the plane due to impacts or user movements);
  the composite material has very little sensitivity to changes in temperature (low coefficient of thermal expansion, low variation of the elastic modulus), has a low density, is non-magnetic, and is corrosion-resistant.

The material described above can also be used in other parts for a timepiece movement comprising at least one flexible portion, said flexible portion being adapted to bend in a plane perpendicular to the axis X of the nanotubes.

Figure 6:
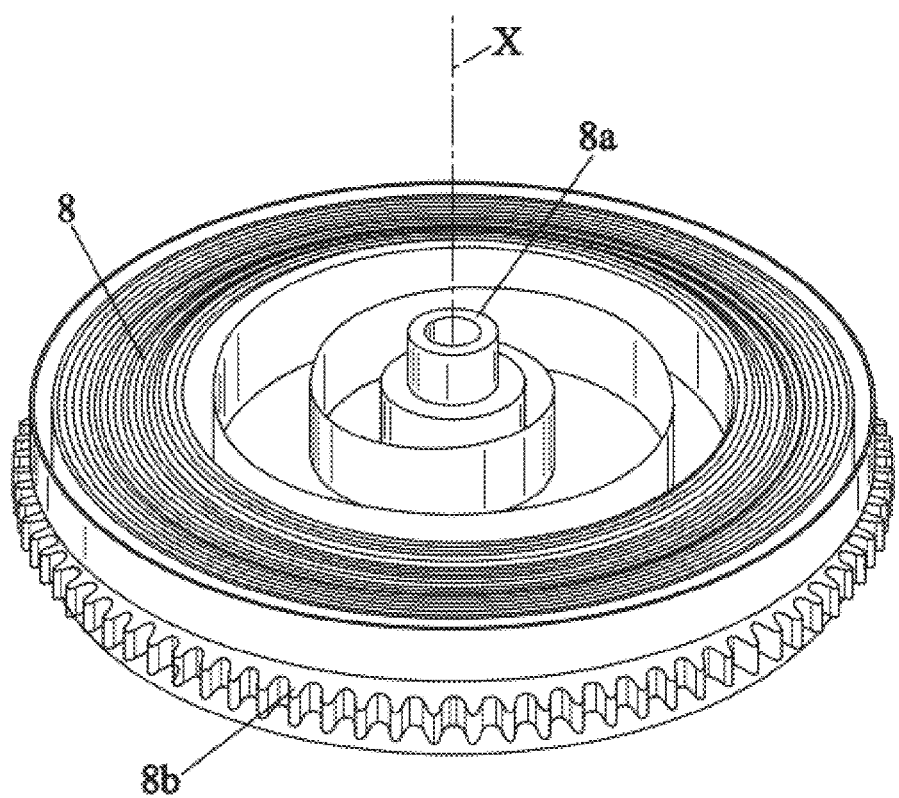
FIG. 6 is a schematic view of a mainspring usable in a timepiece such as the one in FIG. 1, according to a second embodiment of the invention.

For example, in a second embodiment of the invention, the material described above can be used in a mainspring 8 such as the one in FIG. 6, usable as an energy storage device as explained above. Such a spring may for example be wrapped around a central shaft 8a along the axis X, within a barrel 8b.

Figure 7:
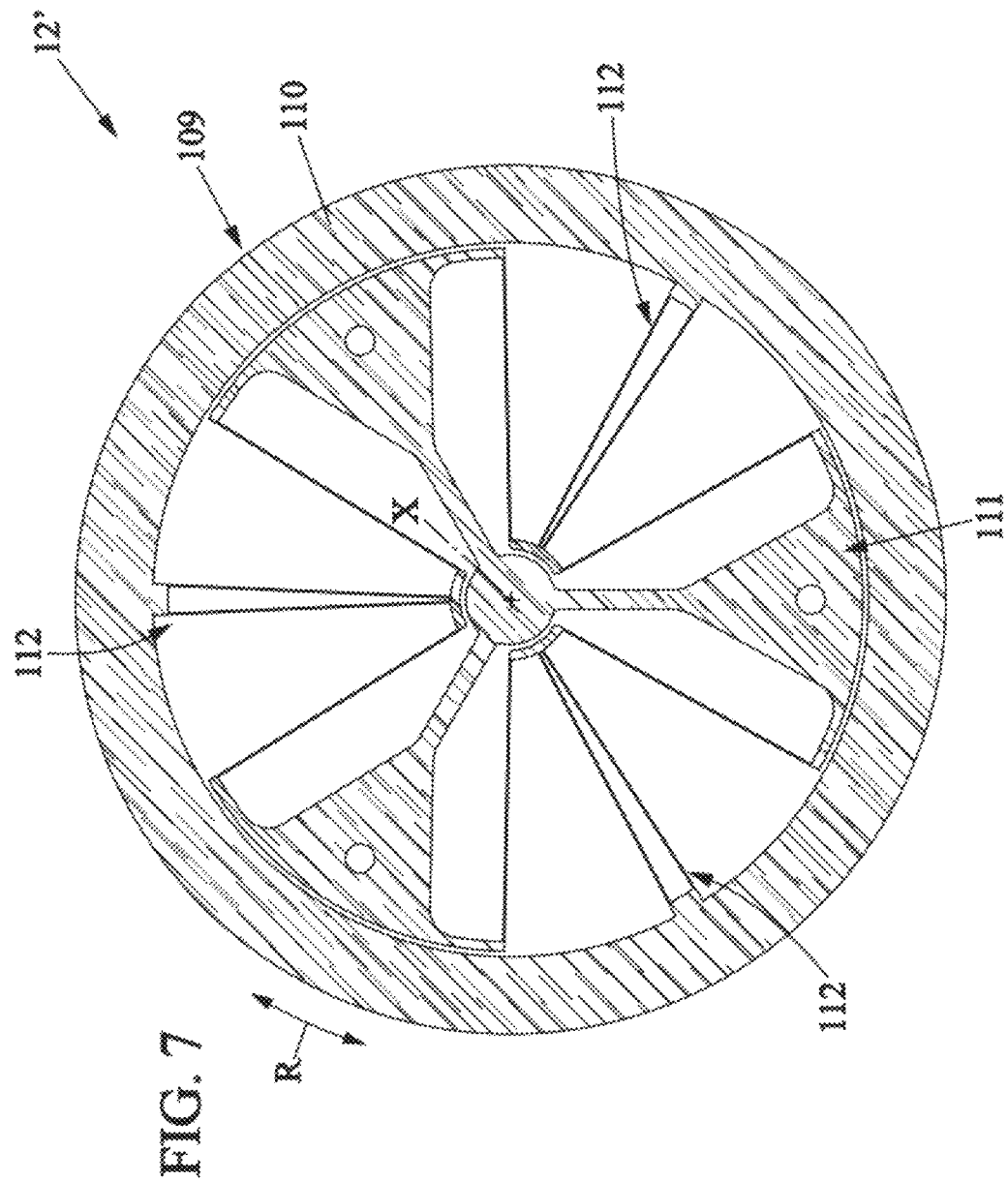
FIG. 7 represents a mechanical oscillator also usable in a timepiece such as the one in FIG. 1, according to a third embodiment of the invention.

According to another example, in a third embodiment of the invention, the material described above can be used to form a mechanical oscillator other than the aforementioned coil spring. In particular, the material described above can be used to form a regulator 12' such as the one in FIG. 7, usable in the timepiece in place of the abovementioned regulator 12. The regulator 12' may for example be formed as a single part in a plate 110, inside of which are formed a rotor 111 and elastic suspensions 112 connecting the rotor 111 to the rest of the place 110. The elastic suspensions may be formed by very fine and slender arms formed in the plate 110. The rotor 111 oscillates in rotation about the axis X, according to the double arrow R. An example of such a regulator 12' is described in detail in document EP3021174A.

The invention claimed is:

1. A spring for a timepiece movement comprising at least one spiral flexible portion extending in a plane around a central axis perpendicular to said plane. said flexible portion being made of a composite material comprising nanotubes bound in a matrix,
  wherein the nanotubes form a forest of nanotubes, the nanotubes being juxtaposed and generally arranged in parallel to said central axis,
  wherin bending of said spiral flexible portion in said plane does not result in a bending of the nanotubes, mechanical properties of said spiral flexible portion being provided mostly by the matrix.

2. The spring for a timepiece movement according to claim 1, wherein the nanotubes are of carbon.

3. The spring for a timepiece movement according to claim 1, wherein the nanotubes are multi-walled.

4. The spring for a timepiece movement according claim 1, wherein the nanotubes have a diameter comprised between 7 and 30 nm.

5. The spring for a timepiece movement according to claim 1, wherein the nanotubes have a length comprised between 200 and 400 microns.

6. The spring for a timepiece movement according to claim 1, wherein the matrix is of carbon.

7. The spring for a timepiece movement according to claim 1, said spring for a timepiece movement being a coil spring adapted to oscillate about said central axis.

8. The spring for a timepiece movement according to claim 1, said spring for a timepiece movement being a mainspring.

9. A timepiece movement having a spring according to claim 1.

10. The timepiece comprising a timepiece movement according to claim 9.

11. An oscillator for a timepiece movement, said oscillator extending in a plane and comprising a fixed part, a rotor rotatable around a central axis perpendicular to said plane and elastic suspensions connecting the rotor to the fixed part, at least said elastic suspensions being made of a composite material comprising nanotubes bound in a matrix, wherein the nanotubes form a forest of nanotubes, the nanotubes being juxtaposed and generally arranged in parallel to said central axis, whereby bending of said elastic suspensions in said plane does not result in a bending of the nanotubes, mechanical properties of said elastic suspensions being provided mostly by the matrix.

12. A Timepiece movement having an oscillator according to claim 11.

13. A Timepiece comprising a timepiece movement according to claim 12.

* * * * *